(12) United States Patent
Rickrode

(10) Patent No.: US 7,525,435 B2
(45) Date of Patent: Apr. 28, 2009

(54) METHOD, APPARATUS, AND SYSTEM FOR SECURING AREAS OF USE OF VEHICLES

(75) Inventor: C. Joseph Rickrode, Nashua, NH (US)

(73) Assignee: Performance Partners, LLC, Nashua, NH (US)

( * ) Notice: Subject to any disclaimer, the term of this patent is extended or adjusted under 35 U.S.C. 154(b) by 223 days.

(21) Appl. No.: 11/496,677

(22) Filed: Jul. 31, 2006

(65) Prior Publication Data

US 2007/0030122 A1 Feb. 8, 2007

Related U.S. Application Data

(60) Provisional application No. 60/704,785, filed on Aug. 2, 2005, provisional application No. 60/704,786, filed on Aug. 2, 2005, provisional application No. 60/704,787, filed on Aug. 2, 2005.

(51) Int. Cl.
*G08B 13/14* (2006.01)
(52) U.S. Cl. ............. 340/572.1; 340/568.1; 340/825.34
(58) Field of Classification Search ... 340/572.1–572.9, 340/568.1, 571, 573.1, 568.7, 825.31, 825.34
See application file for complete search history.

(56) References Cited

U.S. PATENT DOCUMENTS

| | | | | |
|---|---|---|---|---|
| 4,990,757 A | * | 2/1991 | Edwards et al. | ............. 235/384 |
| 5,751,973 A | * | 5/1998 | Hassett | ......................... 705/13 |
| 6,340,935 B1 | * | 1/2002 | Hall | ......................... 340/932.2 |
| 6,865,539 B1 | * | 3/2005 | Pugliese, III | ................... 705/5 |
| 6,945,303 B2 | * | 9/2005 | Weik, III | .................... 160/188 |
| 6,970,101 B1 | * | 11/2005 | Squire et al. | ............. 340/932.2 |

* cited by examiner

*Primary Examiner*—Benjamin C Lee
*Assistant Examiner*—Daniel Previl
(74) *Attorney, Agent, or Firm*—Vernon Maine & Associates

(57) ABSTRACT

A method and system for securing, protecting and controlling defined areas by managing access points for entering and exiting vehicles or mobile entities, and matching entering vehicle or mobile entity identification information with exiting identification information. This may include obtaining and storing a unique onboard signature and/or physical characteristics from entering vehicles or mobile entities for matching with the identity information obtained from exiting vehicles or mobile entities. In addition a paper or electronic Ticket/Tag may be encoded with the entering identification information and issued to an agent of the entering vehicle or mobile entity for later presentation at exiting, whereby a three-way matching of exiting, entering, and Ticket/Tag information must be satisfied for the vehicle or mobile entity to be released from the controlled area.

20 Claims, 3 Drawing Sheets

Above Info Related to PPA's US60/704,785 + 786 & 787

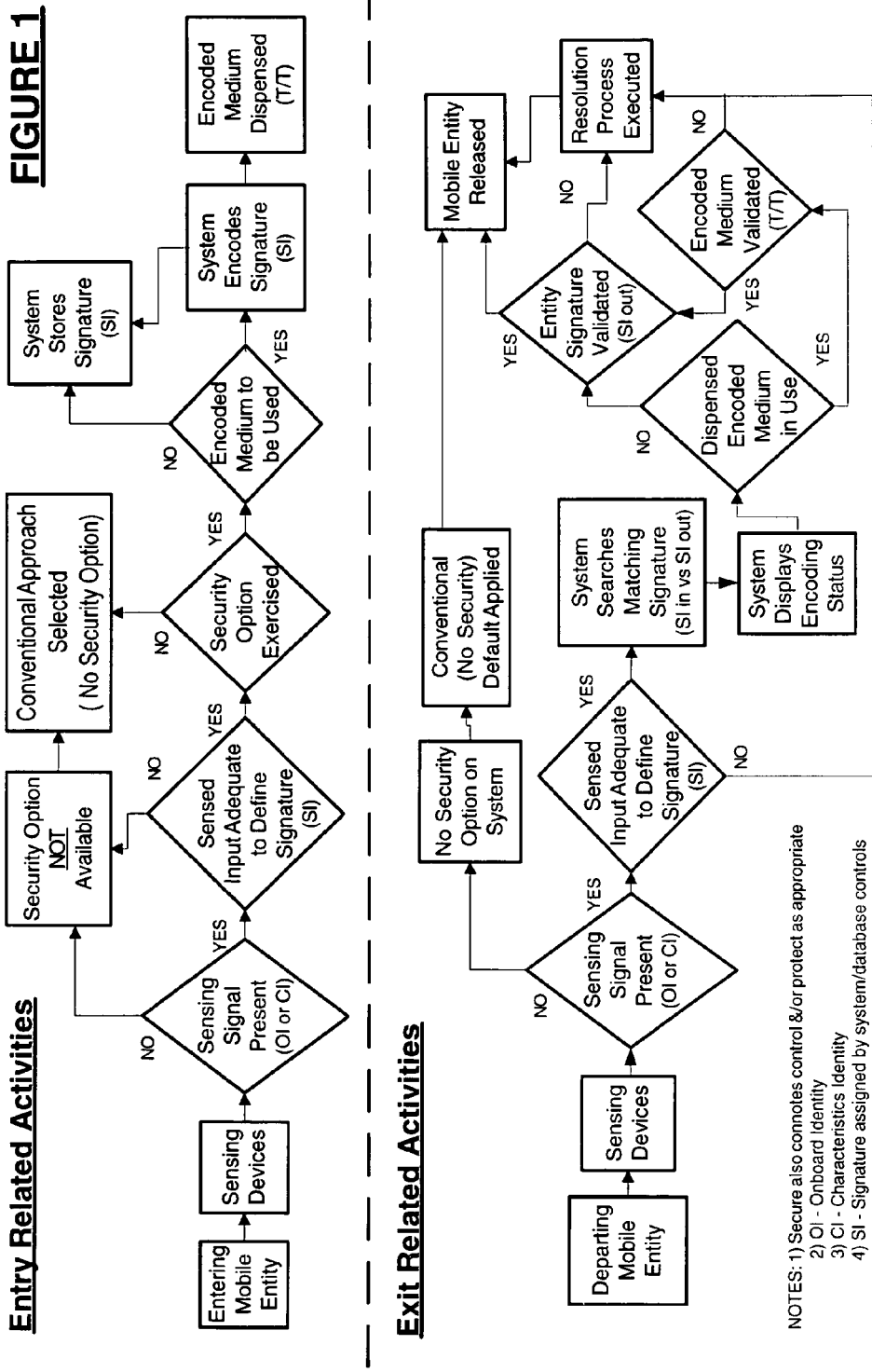

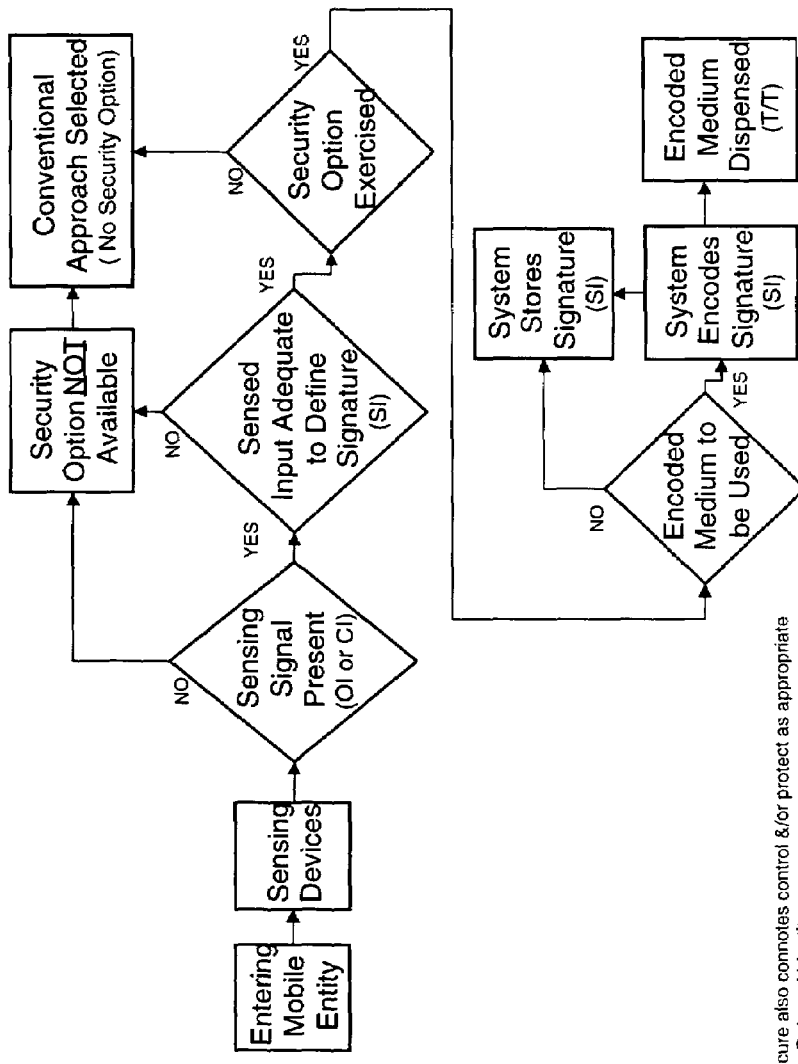

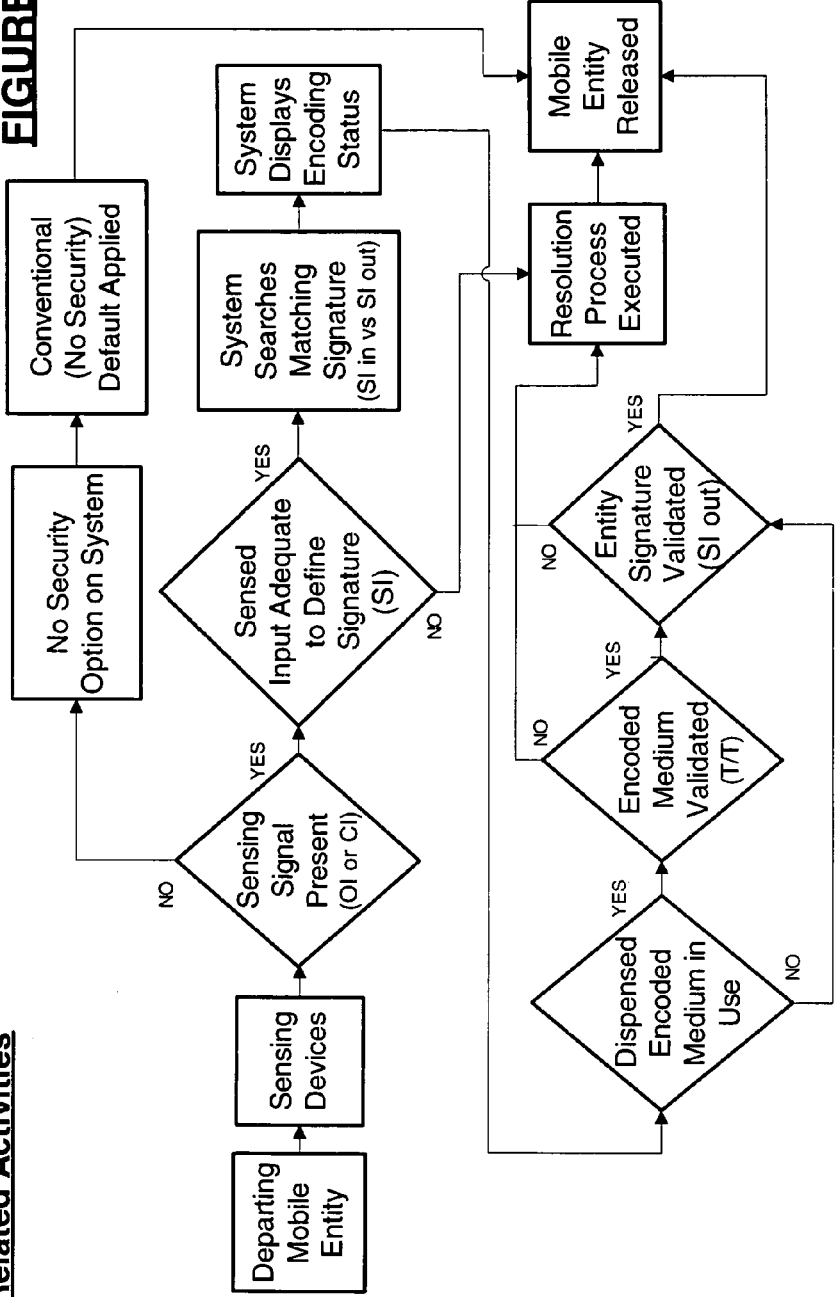

METHOD, APPARATUS, AND SYSTEM FOR SECURING AREAS OF USE OF VEHICLES

BACKGROUND OF THE INVENTION

This patent application claims the benefit of U.S. Provisional Patent Application No. 60/704,785 filed Aug. 2, 2005; U.S. Provisional Patent Application No. 60/704,786 filed Aug. 2, 2005; U.S. provisional Patent Application No. 60/704,787 filed Aug. 2, 2005; each sequentially entitled as: "Vehicle Parking Security System-Unique Characteristics Database Stored"; "Vehicle Parking Security System-Vehicle Characteristics Tied to Parking Ticket/Tag"; and "Vehicle Parking Security System-Vehicle Signature Tied to Parking Ticket/Tag". The Graphs or Tables, the method of use, the advantages and additional characteristics and the functionality of the three (3) U.S. Provisional Patent Applications are included herein and as referenced thereto. The original concept of "vehicle" is expanded herein to include applications for any "mobile entity" when suitably adapted to said applications.

Throughout this disclosure, the following applies:

a) secure, securing, secured or securable also connotes control, controlling, controlled or controllable and/or protect, protecting, protected or protectable where/as applicable and/or appropriate;

b) vehicle connotes any mobile entity including one moved by another vehicle such as a cargo container, skid, trailer, et. al.;

c) mobile entity connotes any/all transportables whether self-powered vehicles such as autos or trucks or transported by auxiliary means/methods such at transporting trailers, cargo containers, cartons, skids/pallets, et. al.; and

FIELD OF THE INVENTION

This invention is a method, apparatus and system for detecting the presence of a specific mobile entity and securing same in a defined area or under definable control parameters.

In one form the invention relates to a method, apparatus and/or system for detecting the presence of specific/discrete mobile entities and securing areas (or routes) of use, presence, storage and/or transport of said mobile entities (vehicles) for simplicity of conceptual invention understanding only. The invention in another form relates to a new and useful system and method for recognizing a vehicle which has been pre-identified through the use/means of an "Onboard Identity" (OI) as a "signature" (SI) vehicle (entity), i.e., having a pre-defined/detectable onboard identity, before access to a secured area. Additionally and/or alternately the invention may be directed to or include identifying key characteristics of an entering non-OI equipped vehicle and creating a vehicle Characteristics Identity (CI) based upon physical and/or discrete, information (e.g., license plate, VIN (vehicle identification number, identification tag/seal, color, shape, manufacturer, year and model details, physical/structural features, et. al.) of the entering vehicle, all captured prior to entry to a secured or securable area. Additionally, the invention relates to further features of the system, which may or may not apply in all cases, to provide for identification of the vehicle which entered as authorized to exit, pass through or depart primarily based upon confirmation of the identical nature of the exiting vehicle via the onboard OI or the CI created for that vehicle upon its entry and the proper/authorized use by the party responsible for the exiting vehicle of the Ticket/Tag which was issued upon entry.

DESCRIPTION OF THE PRIOR ART

Applicant and inventor hereof is not familiar with any presently operating systems which carry out the functions and provide for the many features and advantages of the present invention in any manner and particular in no manner as disclosed herein by the Applicant.

Applicant strongly contends that there is substantial and significant value in being able to effectively identify, monitor and in some circumstance even control vehicle access to and exit from a secured area such as a parking lot, staging/storage area or a public, private or government facility of any type or configuration where security can be reasonably exercised. It is important to note that the so called "secured area" could and does include "definable areas/zones" of any type accessed by mobile entities (vehicles) including but not limited to towns, cities, tunnels, bridges, terminals of any type (bus stations, train stations, airports, subways, depots and the like).

There is nothing currently available which satisfies these needs and objectives. However, the invention disclosed herein does meet all of these objectives.

SUMMARY OF THE INVENTION

This invention most generally relates to a system for protecting, controlling and securing a region entered and exited by vehicles. The system in one aspect comprises a means for obtaining a vehicle identification information relative to an entering vehicle, wherein the vehicle identification information is either an onboard-identity/signature or a non-onboard-identity/signature sometimes identified as a vehicle characteristic. The non-onboard-identity/signature vehicle as a characteristic identity, is derived from at least one readable feature of the entering vehicle. These readable features could be one or any combination of features such as manufacturer, model, year, VIN, physical size, color, shape and registration/license tag.

Thus, one aspect of the invention is to provide a system and method for identifying, relating, rejecting or accepting an entering vehicle as a vehicle with no potential problem as the vehicle enters into a protected or protectable area or region.

Another aspect of the system and method is to provide the entering vehicle operator with a form of document or a ticket/tag which is randomly coded to the entering vehicle identification.

A further aspect of the invention is to provide for additional data associated with the entering vehicle such additional data may be the date and time of entry.

An additional aspect of the invention is to provide means and method for obtaining vehicle identification information for an exiting vehicle and comparing such exiting vehicle identification with the vehicle identification of entering vehicles for a matching review of stored data thereby allowing exit of the vehicle based upon the finding of a matching identification, or not allowing the exit of the vehicle if no matching is found in the stored data base.

A still further aspect of the invention is to provide a means and method for comparison and review of the obtained identification information of the entering vehicle with stored information. The stored information being information entered by or from other locations for identification and/or tracking purposes of any type such as securing/quarantining/isolating potentially problem vehicles of any type.

It is clear that there may be variations in the information sensing devices, the computer or system components related to capturing, storing, searching and/or retrieving data/information from files or storage means of any type and making comparisons and matching or confirmations of a vehicle with stored data. However, the main features are consistent and are;

1) Having a method and means for identifying a vehicle at a specific location of the secured area referred to as the entry location or position by:

a) sensing an Onboard Identity (OI) code of the vehicle if the vehicle has such a code when it arrives; or b) creating a suitable Characteristics Identity (CI) for a non-Onboard vehicle by detection of select characteristics of the vehicle such as manufacturer, year, registration, license plate, VIN, identification tag/seal, color, shape, model details, physical/structural features, et. al.;

2) Creating the vehicle Signature (SI) assigned to the vehicle for use while in the confines of the defined area/zone being accessed, i.e., there is a creation of a vehicle-specific/unique signature such as but not limited to a random and encoded sequence of numbers, characters and/or letters as the vehicle SI;

3) The vehicle OI and/or (select) sensed characteristics composing the CI can be provided to data storage systems for future use if/when needed for comparison and review of matching information with stored information or information entered by or from other locations for identification and/or tracking purposes of any type such as securing/quarantining/isolating potentially problem vehicles of any type;

4) A vehicle within a secured area may exit the secured area:

a) after #1 above is repeated to re-establish/verify the OI signature and/or CI of the departing vehicle's signature to confirm departure is authorized;

b) a database/system verification of the vehicle's overall SI produces no results and/or information indicating the vehicle must/should be detained for any reason; and c) if any applicable, proper payment is made based upon the time and date of entry and exit of the vehicle when the system is used for security and/or control and/or protection of a parking or storage area.

These and further objects of the present invention will become apparent to those skilled in the art to which this invention pertains and after a study of the present disclosure of the invention.

BRIEF DESCRIPTION OF THE DRAWINGS

Included herewith in this application are three (3) drawing figures each of which is a flow diagram of the various functional components of the system of this invention and showing the relationships and association of entering and/or exiting mobile entities, the information obtained and evaluated and the path of action taken upon evaluation of the data collected and/or stored. The character of the operation of the invention is represented and the secured or securable area, also identified as a controlled and/or protected area, would include those elements of the system determined to be essential for the particular characteristics of the area to be secured (controlled and/or protected).

FIG. 1. is a flow chart representation of one embodiment of the invention which includes elements for managing entering and exiting mobile entities;

FIG. 2. is a flow chart representation of another embodiment of the invention which includes only elements directed to managing entering mobile entities; and FIG. 3. is a flow chart representation of still another embodiment of the invention which includes elements directed to managing exiting mobile entities.

DESCRIPTION OF THE PREFERRED EMBODIMENTS

Throughout this disclosure, the following identification of elements and features of the invention applies:

a) secure, securing, secured or securable also connotes control, controlling, controlled or controllable and/or protect, protecting, protected or protectable where/as applicable and/or appropriate;

b) vehicle connotes any mobile entity including one moved by another vehicle such as a cargo container, skid, trailer, et. al.;

c) mobile entity connotes any/all transportables whether self-powered vehicles such as autos or trucks or transported by auxiliary means/methods such at transporting trailers, cargo containers, cartons, skids/pallets, et. al.;

d) In any and all applications relating to the collection and use of data, details, and the like, one's right to privacy must not to be violated unless so approved and properly documented by the responsible authorities.

The following is a description of the "preferred" embodiment of the invention providing for mobile entity (vehicle) security in an area/zone which is accessed, passed through, or provides mobile entity storage for any reason. It is clear that there may be variations in the information sensing devices, the computer or system components related to capturing, storing, searching and/or retrieving data/information from files or storage means of any type and making comparisons and matching or confirmations of a vehicle with stored data. However, the main features are consistent and are;

1) Having a method and means for identifying a vehicle at a specific location of the secured area referred to as the entry location or position by:

a) sensing an Onboard Identity (OI) code of the vehicle if the vehicle has such a code when it arrives; or b) creating a suitable Characteristics Identity (CI) for a non-Onboard vehicle by detection of select characteristics of the vehicle such as manufacturer, year, registration, license plate, VIN, identification tag/seal, color, shape, model details, physical/structural features, et. al.;

2) Creating the vehicle Signature (SI) assigned to the vehicle for use while in the confines of the defined area/zone being accessed, i.e., there is a creation of a vehicle-specific/unique signature such as but not limited to a random and encoded sequence of numbers, characters and/or letters as the vehicle SI;

3) The vehicle OI and/or (select) sensed characteristics composing the CI can be provided to data storage systems for future use if/when needed for comparison and review of matching information with stored information or information entered by or from other locations for identification and/or tracking purposes of any type such as securing/quarantining/isolating potentially problem vehicles of any type;

4) A vehicle within a secured area may exit the secured area:

a) after #1 above is repeated to re-establish/verify the OI signature and/or CI of the departing vehicle's signature to confirm departure is authorized;

b) a database/system verification of the vehicle's overall SI produces no results and/or information indicating the vehicle must/should be detained for any reason; and c) if any applicable, proper payment is made based upon the time and date of entry and exit of the vehicle when the system is used for security and/or control and/or protection of a parking or storage area.

The fundamental characteristics and distinction of the invention is the system which takes the physical, structural and/or other potential characteristics of the vehicle (mobile entity), upon entry to the secured area such as a parking or storage facility (lot, garage, etc.), or a private, government or military facility or base, or a cargo/freight/container/trailer facility/area and such information is stored in data form in a system which may then be accessed immediately or at various times in the future by authorized users of such data which can be examined, converted, manipulated and/or transferred in potentially a broad variety of ways/methods as needed and ultimately to release and display the vehicle characteristics which where identified and stored in any form (typically digital or analog) as appropriate for the applications.

Specific vehicle entry and exit dates, times, frequencies (relative to use of the parking/storage facility), and possible any vehicle occupants, whether one or more, would be data/details potentially available for study and/or analysis potentially for a wide variety of applications, if so authorized. Particular and relatively non-ordinary vehicle features, as well as any onboard signature, might be analyzable by those organizations having authority and/or licensed to access, handle and review such data and/or details.

Unique vehicle and/or occupant characteristics may be captured during each entry into and exit from any secured area. One purpose, along with many others, might be to explore presence, patterns, frequencies, etc. of possibly significant and/or related events. Database details, captured over time, could be analyzed for characteristics potentially related to location and/or entry-exit security and/or evolving activities or events either deserving proactive intervention before negative, possibly disastrous situations can occur or for reconstruction of past circumstances.

One example of the basic sequence of events, relative to the use of the security system for vehicles secured (parked/stored) in a controlled area, and in particular an area for taking in vehicles for parking where a level of security exists, is provided in the sequential description below: Entry Sequence:

1) A vehicle enters one parking access entry lane of possibly a plurality of entry locations and potentially concurrent with a plurality of vehicles each entering one of the other entry lanes;

2) An Onboard Identity (OI) code in the vehicle and/or alternatively camera(s), sensor(s) or other forms of detection and recordation device(s), are positioned such that information relative to the entering vehicle including, if appropriate operator/occupant information perhaps in the form of a photograph, as well as details such as vehicle manufacturer, model, color, size, license plate, VIN, etc. all or some of which may be detected and recorded thereby creating a vehicle Characteristics Identity (CI).

3) A security monitoring/tracking system is provided which may be in the form of a computer and/or processor or a similarly functional system of components which causes the creation of a random and/or encoded sequence of characters, bar codes, numbers, letters. et. al., as the vehicle "Signature" (SI) based or either the OI or CI or both;

4) A physical ticket/tag (receipt of any type) containing the time and date of entry of the vehicle plus an encoding of the vehicle SI is dispensed or issued from a dispensing device. The encoded SI may be in a text form or any alternative forms such as but not limited to bar-code, magnetic strip, encryption or a variety of other forms. The operator of the entering vehicle may then progress to a parking region/area/location and secure the vehicle. Exit Sequence 5) The method and system used to ultimately create the stored vehicle signature SI at entry is similarly located at an appropriate position for exiting the secured area. The controlled area may be a secured parking, storage, or staging area but could also be as diverse as a region of vehicle entry and exit on a substantially continuous basis-for example entry into or onto a monitorable road/route/area or a private, government, military facility, even where exiting may occur very soon there from;

6) A system, such as computer and/or processor or similarly functioning system of components, is used for matching the exit created SI to the initial SI developed and recorded/stored at the entry position. If such an SI match is found, the SI is provided to the system/terminal at the exit point which might also have an attendant operator, security guard, or electronic checkout terminal, depending on the controls being exercised. In a secured parking application, the vehicle operator/driver will likely possess the T/T (or equivalent), received at the time of vehicle entry, which is encoded with the system recorded entry SI. If the vehicle operator provided T/T information matches the SI received from the match-finding system, an ACCEPT signal will be displayed or audibly communicated. The original facility entry time and date, as indicated by the T/T are then used to compute any fees, if applicable, based upon the exit time and date. Such fees are accepted by the attendant or checkout terminal facility in any established/acceptable payment form. If a diverse vehicle entry and exit situation exists per #5 above, a unique exit process will be utilized to align with the parameters present and controls required;

7) If an SI mismatch of any kind is found, the attendant and/or the checkout terminal conveys a REJECT notice along with a routine required of the vehicle operator to resolve the mismatch by proving such factors as ownership, damage to the T/T, proof of a relationship between the vehicle operator at entry and the vehicle operator at exiting, possession of the T/T created and dispensed at entry, etc.; and 8) If all efforts fail to resolve the problems associated with justifying an ACCEPT condition, i.e., a FAIL condition repeats/persists, the vehicle is detained and security methods (defined by the responsible facility or entity authority) are applied.

FIGS. 1 through 3 describe examples of the presently known applications or uses of the method, apparatus and system of this invention. FIG. 1 provides a start to finish complete overview of one example of the entire entry/exit process. FIG. 2 expands the Entry Related Activities to convey a mobile entity either with an Onboard Identity (OI) or sensing of discrete, specific physical characteristics to collectively create a Characteristics Identity (CI). Either the OI or CI can be utilized to create a system-stored entity Signature (SI) associated with a Ticket/Tag encoded and delivered to the entity owner/operator for later reclaiming of the specific entity.

Similarly, FIG. 3 expands the sequential activities associated with later reclaiming of an entity after some time period that the entity has been secured (controlled and/or protected) in a defined area or zone. The key process attributes in this figure relate to the level of security provided through both a re-identification via the Onboard Identity (OI) or the collective identity characteristics associated with a multi-sourced Characteristics Identity (CI). The encoded Ticket/Tag is the key to legitimizing the holder's right to reclaim the stored entity/vehicle at this later date. Any Ticket/Tag whose encoding does not align with the electronically filed Signature (SI) will be rejected automatically and the entity will remain secured.

Included below in text form are examples of the invention having incorporated therein different forms of vehicle sensor systems to read/interpret an Onboard Identity (OI) device then system generate and store a unique vehicle "Signature" (SI). In one example there is a reference to "Vehicle Signature" which means a unique set of identity details associated with the OI create a unique system defined SI which is then encoded/encrypted for this particular vehicle and dispensed to the vehicle operator in some Ticket/Tag (T/T) removable claim check. The OI is a vehicle-unique identity tag or label, either installed at the factory or at a later date, which contains a unique code or fingerprint assigned to that vehicle. The OI can be in a broad variety of forms such as an infrared light energy pattern, a detectable barcode tag readable from outside the vehicle, or a coded frequency and signal transmitter which is detected by the entry and exit systems for creating the SI defined for the entering vehicle. The sensor is disclosed as an infrared system, or an RF system (radio frequency form).

In another example of the invention described below, there is a reference to "Vehicle Characteristics" which mean that structural, physical, color, manufacturer, model, year, license tag, VIN and/or other discrete physical characteristics associated with the particular entering vehicle are detected as a unique collective composite defining a Characteristics Identity (CI) for the vehicle. This CI fingerprint is system stored and a unique SI is generated, along with the dispensing of a T/T as described above. The sensor system may be a plurality of camera systems, (digital video, magnetic video or any other form of image capture).

Parking Security—Vehicle Signature Tied to Parking Ticket/Tag

1) Vehicle contains a unique (stationary, permanent or portable) identity device.
2) When entering parking area, unique identity device is read/sensed by area equipment (optical, RF, infrared, et. al).
3) Vehicle identity may be "system" stored/filed, at driver's discretion.
4) System ties unique identity to a vehicle identifier, e.g., random no, swipe card code, et. al., retained/removed by the vehicle driver.
5) Unique vehicle identifier provided to owner on transportable medium, e.g., parking ticket, etc.

With Pre-Sensing Prior to Exit Check-Out

6) When vehicle exiting parking area, unique identity device is read/sensed by area equipment (optical, RF, infrared, et. al):
    a) At a pre-sensing point between parked location and check-out; or
    b) At (staffed or un-staffed) checkout point.
7) Unique identifier number/mark/code system associated with original dispensed ticket number.
8) At checkout point, parking ticket or other physical device with unique identifier(s) is validated against the unique vehicle related identifier. Code on transportable medium (ticket) is compared to (optical, RF, infrared, et. al) re-scan of vehicle's unique (stationary or permanent) identity device read/sensed by area equipment.
9) Unique identifier number/mark/code system associated with dispensed ticket number:
    a) If unique ticket encoded identity matches unique vehicle identity, exiting proceeds.
    b) If (all) required identifier(s) do not match, area methods (gate or similar) detain vehicle pending resolution.

Without Pre-Sensing Prior to Exit Check-Out

6) When vehicle approaching parking area exit check-out, the vehicle unique identity device is read/sensed by area equipment (optical, RF, infrared, et. al).
7) At checkout point, parking ticket or other physical device with unique identifier(s) is validated against the unique vehicle related identifier. Code on transportable medium (ticket) is compared to (optical, RF, infrared, et. al) re-scan of vehicle's unique (stationary or permanent) identity device read/sensed by area equipment.
8) Unique identifier number/mark/code system associated with dispensed ticket number:
    a) If unique ticket encoded identity matches unique vehicle identity, exiting proceeds.
    b) If (all) required identifies do not match, area methods (gate or similar) detain vehicle pending resolution.

Parking Security—Vehicle Characteristics Tied to Parking Ticket/Tag

1) Area mounted (stationary/permanent) optical system(s) capture unique characteristics for each vehicle upon entering a controlled area/zone.
2) Distinguishing characteristics may include but are not be limited to: a) License plate with/without sufficient surrounding vehicle details to tie plate details to a unique vehicle type, e.g., model, color, etc.; &/or, b) Vehicle VIN number; &/or, c) Vehicle occupant(s) Vehicle.
3) A unique vehicle identity is established using distinguishing characteristics (per #2) and can be stored/filed by the system identity capabilities for future use.
4) System ties unique identity to a vehicle identifier, e.g., random no, swipe card code, et. al., retained/removed by the vehicle driver.
5) Unique vehicle identifier provided to owner on transportable medium, e.g., parking ticket, etc.

With Pre-Sensing Prior to Exit Check-Out

6) When vehicle exiting parking area, unique vehicle (identity) characteristics are read/sensed by area optical sensors:
    a) At a pre-sensing point between parked location and check-out; or
    b) At (staffed or un-staffed) checkout point.
7) Sensed unique (identity) characteristics are system associated with original dispensed ticket number.
8) At checkout point, parking ticket or other physical device with unique identifier is validated against the unique vehicle identity characteristics. Code on transportable medium (ticket) is compared to optical re-scan of vehicle's unique identity characteristics read/sensed by area equipment.
9) Unique identifier number/mark/code system associated with dispensed ticket number:
    a) If unique ticket encoded identity matches unique vehicle identity, exiting proceeds.
    b) If (all) required identifier(s) do not match, area methods (gate or similar) detain vehicle pending resolution.

Without Pre-Sensing Prior to Exit Check-Out

6) When vehicle approaching parking area exit check-out, the vehicle unique characteristics are read/sensed by area optical equipment.
7) At checkout point, parking ticket or other physical device with unique identifier(s) is validated against the unique vehicle related identity. Code on transportable medium (ticket) is compared to optical re-scan of vehicle's unique identity read/sensed by area equipment.

8) Unique identifier number/mark/code system associated with dispensed ticket number:
   a) If unique ticket encoded identity matches unique vehicle identity, exiting proceeds.
   b) If (all) required identities do not match, area methods (gate or similar) detain vehicle pending resolution.

In both the OI and CI based identity systems, the same system/methods utilized at vehicle entry are repeated during the exiting activities and the OI and/or CI identity characteristics are duplicated to confirm the same, identical vehicle is now departing. The originally dispensed T/T from vehicle entry must be produced and system validated to confirm the surrendered encoded T/T was the one dispensed when this vehicle entered since it will contain the system defined SI unique to this vehicle. Any applicable fees associated with the parking duration of the secured vehicle are dealt with in the conventional fashion, though likely a premium rate would be associated with the additional security services.

It is thought that the present invention, the means and method and the system for securing (protecting or controlling) areas and/or acquiring additional income potential from a "secured" parking facility, or for providing security to areas which are openly accessible or accessed by vehicles with or without specific access authorization or for recognizing vehicles having an Onboard Identity (OI) as a component part of the vehicle, or alternatively utilizing a variety of discrete vehicle-specific physical characteristic for collectively defining a Characteristic Identity (CI), either of which can be utilized by a site system for defining a site unique Signature (SI) for each vehicle at its entry and during it's on-site presence, and at vehicle exiting the repetition of the same OI and/or CI identification done at vehicle entry to validate authorized departure against the system-stored SI from entry, plus validating the authorized operator of said vehicle via the operator surrendering the encode Ticket/Tag received at vehicle entry which is validated against the system stored SI encoding of same at entry, completing the entire security process of this invention which is totally disclosed herein, recognizing there exists potential variations of the characteristics of the elements of the system of the invention based on site, system and application variations. There currently exists a broad array of features and variations in the available sensing devices, devices for creating identity codes, ticket/tag production methods, as well as system recognition of acceptance criteria at vehicle entry and/or exit.

Variations of the disclosure principles can be applied to both monitor location and control movement and/or flow of a broad variety of entities. Examples include but are not limited to:

1) Should an onboard identity device eventually become a mandatory, integral component built into all vehicle's onboard computerized control systems, a broad variety of monitoring could be exercised, if allowed by law;

2) Expanding the micro (parking lot) example above to a military base or industrial complex monitored at entry and departure points for limited or total movement of select or all vehicles;

3) Restricting or closely monitoring access to and/or movement within controlled areas such as military or industrial complexes so:
   a) unauthorized movement can be detected and or controlled;
   b) only vehicles having permanent Onboard Identity (OI) would be allowed to enter and depart without being security cleared;
   c) vehicles without OI would be issued a temporary identity device which would allow the vehicle's movements onsite to be closely monitored and/or tracked but might set off an alarm if tampered with while on site;

4) Depending on the extent and interaction of monitoring locations, complete sensing networks could potentially be established to monitor and/or control vehicle access to zones of varying sizes, even to the extent of applying these aspects to municipalities where discrete sensing features might be included at major traffic artery points, bridges, tunnels, et. al. Such monitoring could be capable of utilizing either the OI or CI systems or both to detect specific vehicles which may potentially pass through monitoring points such as:
   a) fleeing suspects in known vehicles where the OI was identified via a trail through the license plate; or, a CI signature is established through an eye witness vehicle description;
   b) vehicles identified as used by individuals or factions potentially presenting security risks:
   c) monitoring the movement of persons of interest during evolving criminal cases:

5) Fleets of container/freight vehicles with OI devices could be point-to-point monitored automatically to determine, define and/or provide:
   a) specific arrival and departure details for automatic system tracking and related projections:
   b) compliance with defined schedules, perhaps along progressive delivery routes;
   c) movement and staging of specific containers throughout warehouse staging/transfer points;
   d) system monitoring on-time dependent shipments to verify schedules are or will be met, e.g., all expedited containers are onboard a transport device, e.g., truck, before its departure;
   e) arrival time at client locations for staging 1 sequencing the client's dock utilization as well as utilization of the shipments contents by the client;
   f) automatic system notification to all delivery points should an in-transit delay occur;
   g) maintenance schedules of equipment with an OI by monitoring total activity over time:

6) Securable transport devices such as containers, enclosed pallets, cartons crates. et. al. could utilize these concepts for:
   a) tracking, monitoring and controlling container movement:
   b) tracking conservation of sealed, secured contents within such containers if the sealing device utilized is similarly equipped with sensing devices having OI like features which could emit an alert if seal tampering occurs; and
   c) OI devices could be system tracked on a site (dock, storage, staging area, etc.) for inventory control and location applications.

What is claimed is:

1. A method for managing entering and exiting of vehicles, said method comprising the steps of:
   monitoring points of access to an area so as to detect entering and exiting vehicles;
   obtaining from each said entering vehicle, entering vehicle identification information comprising an electronically readable unique repeatable onboard-identity/signature and storing said entering vehicle information in an information management system;
   offering said entering vehicle a security option comprising:
      (i) creating a unique random code and associating said random code with said entering vehicle identification information in said information management system;
      (ii) forming a Ticket/Tag incorporating said unique random code; and (iii) providing said Ticket/Tag to an agent of said entering vehicle for later identification of said entering vehicle;

obtaining from each said exiting vehicle, exiting vehicle identification information comprising said unique repeatable onboard-identity/signature;

comparing the respective said exiting vehicle identification information with the stored said entering vehicle identification information in said information management system for matching information whereby vehicle identification is confirmed;

permitting exiting vehicles with said matching information to exit; and subjecting exiting vehicles without said matching information to a resolution process.

2. The method of claim 1, comprising:

creating a said unique random code and associating said entering vehicle identification information with said random code in said information management system;

forming said Ticket/Tag incorporating said random code; and providing said Ticket/Tag to said agent of said entering vehicle;

said comparing each said exiting vehicle identification information with said entering vehicle identification information for said matching information further comprising:
(i) decoding the random code on a said Ticket/Tag presented by a said agent in association with said exiting vehicle so as to reveal the Ticket/Tag associated entering vehicle identification information;
(ii) comparing the respective said exiting vehicle identification information with the stored said entering vehicle identification information, and with the Ticket/Tag associated entering vehicle identification information.

3. The method of claim 2 further comprising including actual time of entry of said entering vehicle into said Ticket/Tag.

4. The method of claim 1, said entering vehicle identification information comprising a planned departure schedule for exiting said region, said comparing said exiting vehicle identification information with said entering vehicle identification information comprising comparing an actual departure time with vehicle, said method further comprising comparing actual arrival and departure time the planned departure schedule wherein a discrepancy is reported to said information management system.

5. The method of claim 1, said entering vehicle identification information comprising an arrival and departure schedule for said entering vehicle, said method further comprising comparing actual arrival and departure times to the planned arrival and departure schedule wherein a discrepancy is reported to said information management system.

6. The method of claim 1, said steps of obtaining said entering and exiting vehicle identification information comprising optically scanning said entering and exiting vehicles, said vehicle identification information comprising at least one unique repeatable characteristic of respective said entering and exiting vehicles.

7. The method of claim 1, said vehicle identification information comprising at least one unique repeatable distinguishing characteristic of said entering vehicle selected from the group of distinguishing characteristics consisting of: manufacturer, model, year, VIN, color, size, shape and registration/license tag data.

8. A method for managing entering and exiting of vehicles, said method comprising the steps of:

monitoring points of access to an area so as to detect entering and exiting vehicles;

obtaining from each said entering vehicle, entering vehicle identification information comprising at least one electronically readable unique repeatable distinguishing characteristic of said entering vehicle and storing said entering vehicle information in an information management system;

offering said entering vehicle a security option comprising:
(i) creating a unique random code and associating said random code with said entering vehicle identification information in said information management system;
(ii) forming a Ticket/Tag incorporating said unique random code; and
(iii) providing said Ticket/Tag to an agent of said entering vehicle for later identification of said entering vehicle;

obtaining from each said exiting vehicle, exiting vehicle identification information comprising said unique repeatable distinguishing characteristic of said exiting vehicle;

comparing the respective said exiting vehicle identification information with the stored said entering vehicle identification information in said information management system for matching information whereby vehicle identification is confirmed;

permitting exiting vehicles with said matching information to exit; and subjecting exiting vehicles without said matching information to a resolution process.

9. The method of claim 8, comprising:

creating a said unique random code and associating said entering vehicle identification information with said random code in said information management system;

forming said Ticket/Tag incorporating said random code; and providing said Ticket/Tag to said agent of said entering vehicle;

said comparing each said exiting vehicle identification information with said entering vehicle information for said matching information further comprising:
(i) decoding the random code on a said Ticket/Tag presented by a said agent in association with said exiting vehicle so as to reveal the Ticket/Tag associated entering vehicle identification information;
(ii) comparing the respective said exiting vehicle identification information with the stored said entering vehicle identification information, and with the Ticket/Tag associated entering vehicle identification information.

10. The method of claim 9, further comprising including an actual time of entry of said entering vehicle into said Ticket/Tag.

11. The method of claim 8, said entering vehicle identification information comprising a planned departure schedule for exiting said region, said comparing said exiting vehicle identification information with said entering vehicle identification information comprising comparing an actual departure time with the planned departure schedule wherein a discrepancy is reported to said information management system.

12. The method of claim 8, said entering vehicle identification information comprising an arrival and departure schedule for said entering vehicle, said method further comprising comparing actual arrival and departure times to the planned arrival and departure schedule wherein a discrepancy is reported to said information management system.

13. The method of claim 8, said steps of obtaining said entering and exiting vehicle identification information comprising optically scanning said entering and exiting vehicles.

14. The method of claim 8, said vehicle identification information comprising an unique repeatable on-board identity/signature.

15. A method for managing entering and exiting of mobile entities, said method comprising the steps of:
   monitoring points of access to an area so as to detect entering and exiting mobile entities;
   obtaining entering mobile entity identification information from each said entering mobile entity comprising at least one electronically readable unique repeatable distinguishable characteristics and storing said entering mobile entity information in an information management system;
   providing for said entering mobile entity a security feature comprising:
      (i) creating a unique random code and associating said random code with said entering mobile entity identification information in said information management system;
      (ii) forming a Ticket/Tag incorporating said unique random code; and
      (iii) associating said Ticket/Tag with said entering mobile entity for later identification of said entering mobile entity;
   obtaining from each said exiting mobile entity, exiting mobile entity identification information comprising at least one electronically readable unique repeatable distinguishable characteristic of said exiting mobile entity;
   decoding the random code on a said Ticket/Tag presented in association with said exiting mobile entity so as to reveal the Ticket/Tag associated entering mobile entity identification information;
   comparing the respective said exiting mobile entity identification information with the stored said entering mobile entity identification information in said information management system, and with the Ticket/Tag associated entering mobile entity identification information, for matching information whereby mobile entity identification is confirmed;
   permitting exiting mobile entities with all said matching information to exit; and
   subjecting exiting mobile entities without all said matching information to a resolution process.

16. The method for managing entering and exiting of mobile entities according to claim 15, said mobile entity identification information comprising a unique tracking number associated with said mobile entity.

17. The method for managing entering and exiting of mobile entities according to claim 15, said stored identification information comprising time of entry and exit of said mobile entity to and from the area.

18. The method for managing entering and exiting of mobile entities according to claim 15, said associating said Ticket/Tag with said entering mobile entity comprising sealing said mobile entity with said Ticket/Tag whereby opening said mobile entity requires alteration of said Ticket/Tag.

19. The method for managing entering and exiting of mobile entities according to claim 15, said associating said Ticket/Tag with said entering mobile entity comprising giving said Ticket/Tag to an agent of said entering mobile entity, whereby said agent is required to present said Ticket/Tag in association with the later exiting of the respective mobile entity.

20. The method for managing entering and exiting of mobile entities according to claim 15, further comprising exchanging respective mobile entity information with other information management systems.

* * * * *